US008774151B2

(12) United States Patent
Jia et al.

(10) Patent No.: US 8,774,151 B2
(45) Date of Patent: Jul. 8, 2014

(54) CLOSED-LOOP MIMO SYSTEMS AND METHODS

(75) Inventors: Ming Jia, Ottawa (CA); Jianglei Ma, Kanata (CA); Wen Tong, Ottawa (CA); Peiying Zhu, Kanata (CA)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 13/435,002

(22) Filed: Mar. 30, 2012

(65) Prior Publication Data
US 2012/0230233 A1 Sep. 13, 2012

Related U.S. Application Data

(63) Continuation of application No. 12/293,362, filed as application No. PCT/CA2007/000414 on Mar. 19, 2007, now Pat. No. 8,165,018.

(60) Provisional application No. 60/783,711, filed on Mar. 17, 2006.

(51) Int. Cl.
H04W 4/00 (2009.01)

(52) U.S. Cl.
USPC .......................................................... 370/341

(58) Field of Classification Search
USPC .................................................. 370/341–463
See application file for complete search history.

(56) References Cited

U.S. PATENT DOCUMENTS

| 5,444,800 | A   * | 8/1995  | Kim ............................... 382/239 |
| 5,471,207 | A   * | 11/1995 | Zandi et al. ..................... 341/107 |
| 6,438,695 | B1  * | 8/2002  | Maufer ............................ 726/11 |
| 6,831,909 | B1  * | 12/2004 | Koo et al. ........................ 370/339 |
| 7,248,559 | B2    | 7/2007  | Ma et al. |
| 7,463,577 | B2  * | 12/2008 | Sudo et al. ...................... 370/208 |
| 7,548,506 | B2    | 6/2009  | Ma et al. |

(Continued)

FOREIGN PATENT DOCUMENTS

| WO | 03/021795    | 3/2003 |
| WO | 2006/018710  | 2/2006 |
| WO | 2006/117665  | 11/2006 |

OTHER PUBLICATIONS

Texas Instruments: "MIMO OFDMA E-UTRA Proposal for Different Antenna Configurations", 3GPP Draft; R1-051315 TI MIMO LTE 2, 3rd Generation Partnership Project (3GPP), Mobile Competence Centre; 650, Route Des Lucioles; F-06921 Sophia-Antipolis Cedex; France, vol. RAN WG1, no. Seoul, Korea; Nov. 1, 2005, XP050100920, p. 1-3.

(Continued)

*Primary Examiner* — Fan Ng
(74) *Attorney, Agent, or Firm* — Fay Kaplun & Marcin, LLP

(57) ABSTRACT

Methods, devices and systems are provided for transmitting and receiving MIMO signals. In one embodiment, transmitting of the MIMO signals involves pre-coding each of at least two data symbols using a respective pre-coding codeword to preclude a corresponding plurality of pre-coded data symbols. A respective signal is transmitted from each of a plurality of antennas, the respective signal including one of the pre-coded signals and at least one pilot for use in channel estimation. The signals collectively further include at least one beacon pilot vector consisting of a respective beacon pilot per antenna, the beacon pilot vector containing contents known to a receiver for use by the receiver in determining the codeword used to pre-code the at least one data signal.

21 Claims, 12 Drawing Sheets

(56) References Cited

U.S. PATENT DOCUMENTS

| | | | |
|---|---|---|---|
| 7,590,045 B2 | 9/2009 | Oh et al. | |
| 7,609,752 B2 | 10/2009 | Fujii et al. | |
| 7,644,281 B2* | 1/2010 | Deguillaume et al. | 713/176 |
| 7,697,622 B2* | 4/2010 | Han et al. | 375/260 |
| 7,769,075 B2* | 8/2010 | Hosseinian et al. | 375/140 |
| 2001/0053143 A1 | 12/2001 | Li et al. | |
| 2002/0162071 A1 | 10/2002 | Chang | |
| 2002/0181388 A1* | 12/2002 | Jain et al. | 370/208 |
| 2003/0048753 A1* | 3/2003 | Jalali | 370/252 |
| 2003/0072255 A1 | 4/2003 | Ma et al. | |
| 2003/0074319 A1* | 4/2003 | Jaquette | 705/51 |
| 2003/0148770 A1* | 8/2003 | Das et al. | 455/455 |
| 2004/0081074 A1* | 4/2004 | Piechocki | 370/206 |
| 2004/0085232 A1* | 5/2004 | Ghildiyal | 341/87 |
| 2004/0179627 A1 | 9/2004 | Ketchum et al. | |
| 2004/0252779 A1 | 12/2004 | Rouquette et al. | |
| 2005/0099937 A1 | 5/2005 | Oh et al. | |
| 2005/0128966 A1 | 6/2005 | Yee | |
| 2005/0147131 A1* | 7/2005 | Greer | 370/522 |
| 2005/0180315 A1 | 8/2005 | Chitrapu et al. | |
| 2005/0195763 A1 | 9/2005 | Kadous et al. | |
| 2005/0286663 A1* | 12/2005 | Poon | 375/347 |
| 2006/0013185 A1* | 1/2006 | Seo et al. | 370/343 |
| 2006/0067205 A1* | 3/2006 | Jung et al. | 370/203 |
| 2006/0176803 A1* | 8/2006 | Oh et al. | 370/210 |
| 2007/0173260 A1* | 7/2007 | Love et al. | 455/450 |
| 2008/0112309 A1 | 5/2008 | Hamaguchi et al. | |
| 2008/0232327 A1 | 9/2008 | Kuroyanagi et al. | |
| 2008/0233902 A1* | 9/2008 | Pan et al. | 455/114.3 |
| 2008/0253279 A1 | 10/2008 | Ma et al. | |
| 2009/0086648 A1 | 4/2009 | Xu et al. | |
| 2009/0129502 A1 | 5/2009 | Tong et al. | |
| 2009/0219838 A1 | 9/2009 | Jia et al. | |

OTHER PUBLICATIONS

Alcatel: "Further Simulation Results for 4Tx OL-CL Diversity", 3GPP Draft; R1-031212, 3rd Generation Partnership Project (3GPP), Mobile Competence Centre; 650, Route Des Lucioles; F-06921 Sophia-Antipolis Cedex; France, vol. RAN WG1, no. Lisbon, Portugal; Nov. 19, 2003, XP050098273, pp. 1, pp. 7-11.

Samsung: "Downlink MIMO for EUTRA", 3GPP Draft; R1-060335-PU2RC-EUTRA, 3rd Generation Partnership Project (3GPP), Mobile Competence Centre; 650, Route Des Lucioles; F-06921 Sophia-Antipolis Cedex; France, vol. RAN WG1, no. Denver, USA; Feb. 9, 2006, XP050101282, pp. 1-4.

* cited by examiner $$250 \rightarrow \vec{r}_{beacon\_pilot} = H_c V_p \vec{s}_{beacon\_pilot} + \vec{n}$$

$$252 \rightarrow \hat{V}_p = \arg\min_{k=1,\ldots,L} \left\| \vec{r}_{beacon\_pilot} - H_c V_k \vec{s}_{beacon\_pilot} \right\|^2$$

FIG. 4

280 → $\vec{r}_{beacon\_pilot} = H_c \vec{s}_{beacon\_pilot} + \vec{n}$

282 → $G = H_c V_p$

284 → $\hat{V}_p = \underset{k=1,\ldots,L}{\arg\min} \left\| \vec{r}_{beacon\_pilot} - G V_k' \vec{s}_{beacon\_pilot} \right\|^2$ 286 → $H_c = G V_p'$

FIG. 6

CLOSED-LOOP MIMO SYSTEMS AND METHODS

RELATED APPLICATION

This application is a continuation application of U.S. patent application Ser. No. 12/293,362, which is a national phase entry of PCT Application No. PCT/CA2007/000414, filed Mar. 19, 2007, which claims priority to U.S. Provisional Application No. 60/783,711 filed Mar. 17, 2006, all of which are hereby incorporated by reference in their entirety.

FIELD OF THE INVENTION

The present invention relates to closed loop MIMO (Multiple Input Multiple Output) techniques, more specifically closed loop MIMO techniques involving pre-coding.

BACKGROUND OF THE INVENTION

Closed-loop MIMO aims to significantly improve throughput and reliability of nomadic user equipment (UEs).

Pre-coding is proposed in UMTS (Universal Mobile Telecommunications System) LTE (Long Term Evolution) as one of the main approaches for closed-loop MIMO. Systems that employ pre-coding multiply a data symbol vector $\bar{s}$ containing one element per transmit antenna by a pre-coding matrix F prior to transmission. The received signal is defined by $\bar{r}=HF\bar{s}+\bar{n}$, where H is the channel matrix, and $\bar{n}$ noise. For a system with two transmit antennas and two receive antennas, $\bar{r}, \bar{s}, \bar{n}$ are vectors with two elements each, H is a 2×2 matrix, and F is a 2×2 matrix. The pre-coding matrix F is chosen from a group of predefined matrixes that is called a codebook {F}. In some cases the receiver tells the transmitter which pre-coding matrix to use. For FDD (frequency division duplex) air interfaces the information identifying a pre-coding matrix may be fed back through either channel sounding approaches or codebook index approaches. TDD (time division systems) may also use the codebook based approach. A detailed example of an approach to pre-coding for MIMO transmission is described in D. J. Love, et al, "Limited Feedback Unitary Pre-coding for Spatial Multiplexing Systems", *IEEE Trans. Inf. Theory*, vol. 51, no. 8, pp. 2967-2976, August 2005.

Codebook index feedback involves the receiver signalling to the transmitter an index of which pre-coding matrix to use (so-called codeword index). There are a plurality of indexes each corresponding to a respective pre-coding matrix. One problem, however, is that codebook index feedback approaches use a large amount of uplink radio resources.

Another problem occurs for common pilot based pre-coding schemes. In a common pilot based scheme, the pilots are not pre-coded, and hence have different channel matrices from the data. If the receiver knows the pre-coding matrices used by the transmitter in such scenarios, it can reconstruct the channel matrix with pre-coding effects. When the data channel matrix can be correctly reconstructed, data can be correctly decoded. If, however, the receiver uses a different pre-coding matrix from the transmitter, the constructed effective data channel matrix will be wrong. As a result detected data will be useless due to incorrect channel references. In this case the incorrectly detected data cannot be used for H-ARQ purposes either.

An example of the common pilot approach is shown in FIG. 1 for a two transmit antenna case. In FIG. 1 (and other Figures described below), the horizontal axis 210 is frequency (OFDM (Orthogonal Frequency Division Multiplexing) sub-carriers) and the vertical axis 212 is time (OFDM symbols). Each small circle represents a transmission on a particular sub-carrier over a particular OFDM symbol duration. In locations 214, pilots are transmitted by a first transmit antenna Tx-1, and in locations 216, pilots are transmitted by a second transmit antenna Tx-2. Remaining locations are available for data transmission by both antennas. In the illustrated example, data includes pre-coded data 218 for a first UE (UE-1), and pre-coded data 220 for a second UE (UE-2). Typically, the pre-coding applied for pre-coded data 218 will be different from that applied for pre-coded data 220. With the common pilot approach, the same pilots are used for both UEs and hence they cannot be pre-coded.

In some existing approaches, the codeword index is fed back in a differential manner. In other words the difference between a current index and a previous index is fed back rather than the codeword index per se. Another problem with common pilot based closed-loop MIMO schemes relates to errors that occur in the transmission of the differential codeword index. Closed-loop MIMO is typically intended for nomadic UEs for whom channel conditions will not change very quickly. For each given currently used pre-coding matrix, a small subset of possible next codewords is defined, for example those that would most likely be selected from the full set due to slow channel variation. This subset of codewords can be determined in several ways, such as spatial correlation and matrix correlation. If an index associated with this subset is fed back rather than an index from the entire set of codewords, fewer bits are needed. However, if a feedback error occurs the transmitter will keep using the wrong subsets for subsequent pre-coding updates. That is to say feedback error propagates in differential codeword index feedback. Consider the following example. Suppose that the transmitter and receiver are synchronized at the beginning, and both use codeword $V_0$. Now with the differential codebook index feedback, the new codeword would be $V_1$, which is in the small differential codebook associated with $V_0$. Since an error occurred, the transmitter thinks that it should use $V_1$, which is also from the small codebook associated with $V_0$. For the next feedback, the receiver will feed back a differential index associated with $V_1$, but the transmitter will get the new codeword from the differential codebook associated with $V_2$, and this goes on and on. This is how error gets propagated.

To address this error propagation problem, it has been proposed to periodically reset by transmitting a whole codeword index to correct possible feedback errors. However, this raises more problems than it solves. To begin, the whole codeword can be wrong, and hence error propagates. The resetting is a random process: the reset can begin despite no errors occurring, and may not be done when an error does occur. To make the probability of error propagation low, a large number of resets is required and this quickly diminishes the benefit of differential codeword index feedback. To completely eliminate error propagation, a reset is performed each time, in which case it will cease to be a differential index feedback approach.

Dedicated pilot based schemes suffer shortcomings as well. In a dedicated pilot based scheme, pilots can be pre-coded, and hence have the same channel matrices as data. One problem, however, is that since each UE trying to communicate with a base transceiver station (BTS) does not know what pre-coding matrix is being used by other UEs, the UE is unable to monitor the channel. More specifically, they do not know which pre-coding matrix is being used, do not know the rank of the current channel, cannot estimate per-layer based signal to interference noise ratio (SINR), and are unable to do channel dependent scheduling, to name a few examples.

An example of the dedicated pilot approach is shown in FIG. 2 for a two transmit antenna case. In locations 222,224, dedicated pilots specific to the first UE are transmitted by a first transmit antenna Tx-1 and second antenna Tx-2 respectively. In locations 226,228, dedicated pilots specific to the second UE are transmitted by a first transmit antenna Tx-1 and second antenna Tx-2 respectively. Remaining locations are available for data transmission by both antennas. In the illustrated example, data includes pre-coded data 230 for a first UE (UE-1), and pre-coded data 232 for a second UE (UE-2). Typically, the pre-coding applied for pre-coded data 230 will be different from that applied for pre-coded data 230. With the dedicated pilot approach, different pilots are used for each UE in the sense that they are pre-coded using the same pre-coding matrix as used for the data for each user.

Since both pilot and data go through the same channel, a dedicated pilot scheme is more resilient to codeword index feedback error than common pilot based schemes. Feedback causes performance degradation, but the decoded data can still be used for H-ARQ.

As indicated above, for dedicated pilot based approaches differential feedback error propagates, but the consequences are less severe than in the common pilot case for the UE of interest. However, some of the benefit of pre-coding with all the uplink feedback is lost. Since now the pre-coding matrix is wrong, which is equivalent to a random matrix, HF will have the same properties as H. This means pre-coding is equivalent to no pre-coding, and hence the benefit is lost. When the pre-coding matrix becomes random, the system behaves like an open loop system. Finally, a wrong per-layer based power allocation can further hamper system performance.

SUMMARY OF THE INVENTION

According to an aspect of the invention, there is provided a method of transmitting comprising: pre-coding each of at least two data symbols using a respective pre-coding codeword to produce a corresponding plurality of pre-coded data symbols; transmitting a respective signal from each of a plurality of antennas, the respective signal comprising one of the pre-coded signals and at least one pilot for use in channel estimation; the signals collectively further comprising at least one beacon pilot vector consisting of a respective beacon pilot per antenna, the beacon pilot vector containing contents known to a receiver for use by the receiver in determining the codeword used to pre-code the at least one data signal.

In some embodiments, each transmitted signal is an OFDM signal, and wherein for each antenna the respective signal comprises a null in each sub-carrier and time location used to transmit the at least one pilot in the respective signal of each other antenna.

In some embodiments, the method further comprises pre-coding the pilots for use in channel estimation for transmission; wherein the at least one beacon pilot vector is transmitted without pre-coding.

In some embodiments, the pilots for use in channel estimation are transmitted without pre-coding; the at least one beacon pilot vector is transmitted with pre-coding.

In some embodiments, the method further comprises receiving feedback indicating which pre-coding codeword to use.

In some embodiments, the feedback comprises a differential codeword index.

In some embodiments, the method comprises transmitting to a plurality of receivers with frequency division duplex (FDD) or time division duplex (TDD) separation between content of different receivers; wherein pre-coding comprises using a respective pre-coding codeword for each receiver; the at least one pilot comprises a respective at least one pilot dedicated to each receiver that is pre-coded using the same codeword as the data for that receiver.

In some embodiments, the method comprises transmitting to a plurality of receivers with FDD or TDD separation between content of different receivers; wherein pre-coding comprises using a respective pre-coding codeword for each receiver; the at least one pilot comprise pilots that are for use by all receivers.

In some embodiments, the method is performed for each of a plurality of FDD or TDD MIMO radio resources.

In some embodiments, the FDD or TDD MIMO radio resources are OFDM resources.

In some embodiments, said FDD or TDD MIMO radio resource is single carrier based.

According to another aspect of the invention, there is provided a method of receiving comprising: receiving a MIMO signal containing data symbols pre-coded with a codeword, the MIMO signal including pilots, and including at least one beacon pilot vector containing contents known to a receiver, each beacon pilot vector containing one symbol from each transmit antenna; processing the at least one beacon pilot vector to determine which codeword was used to pre-code the data symbols.

In some embodiments, the method further comprises determining if the determined codeword was a codeword expected to be used.

In some embodiments, the method further comprises comparing the determined codeword with an expected codeword; if there is a match between the determined codeword and the expected codeword, determining there is no error in codeword feedback, and performing decoding.

In some embodiments, the pilots are not pre-coded and the at least one beacon pilot vector is pre-coded, and wherein processing the at least one beacon pilot vector to determine which codeword was used to pre-code the data comprises: performing channel estimation using the pilots to produce channel estimates; using the known contents of the at least one beacon pilot vector, and the channel estimates to determine which codeword was used.

In some embodiments, the pilots are also pre-coded and the at least one beacon pilot vector is not pre-coded, and wherein processing at least one beacon pilot vector to determine which codeword was used to pre-code the data comprises: performing channel estimation using the pre-coded pilots to produce channel estimates; using the known contents of the at least one beacon pilot vector, and the channel estimates to determine which codeword was used.

In some embodiments, the method further comprises transmitting feedback indicating which codeword to use.

In some embodiments, the method further comprises comparing the determined codeword with the codeword indicated by the feedback to determine if there has been a pre-coding codeword feedback error.

In some embodiments, the feedback comprises a differential codeword index.

In some embodiments, the method further comprises tracking a channel of other receivers by processing the at least one un-precoded beacon pilot vector and pre-coded pilots of other receivers.

In some embodiments, the method further comprises upon detecting that there is no pre-coding codeword feedback error, using received data for H-ARQ purposes; upon detecting that there is a pre-coding codeword feedback error, using the determined codeword in place of the codeword indicated by the feedback.

In some embodiments, transmitting the differential codeword feedback based on the codeword determined using the at least one beacon pilot vector.

In some embodiments, the method comprises in a transmitter, executing the method of transmitting as described in embodiments above; in a receiver: receiving a MIMO signal containing data symbols pre-coded with a codeword, the MIMO signal including pilots, and including at least one beacon pilot vector containing contents known to a receiver, each beacon pilot vector containing one symbol from each transmit antenna; processing the at least one beacon pilot vector to determine which codeword was used to pre-code the data symbols.

According to yet another aspect of the invention, there is provided a transmitter that executes methods of transmitting a described above.

According to yet a further aspect of the invention, there is provided a receiver that executes methods of receiving as described above.

According to yet another aspect of the invention, there is provided a method comprising: provisioning a frequency division duplex MIMO radio resource for facilitating detection of feedback errors; where said resource includes at least one pilot for each transmit antenna; and where said provisioning includes pre-coding a known signal vector when said pilots are not pre-coded.

According to another aspect of the invention, there is provided a system comprising: a controller operable to: provision a frequency division duplex MIMO radio resource for facilitating detection of feedback errors; where said resource includes at least one pilot for each transmit antenna; and where said controller is further operable to pre-code a known signal vector when said pilots are not pre-coded.

According to another aspect of the invention, there is provided a system comprising: a controller operable to: provision a frequency division duplex MIMO radio resource for facilitating detection of feedback errors; where said resource includes at least one pilot for each transmit antenna; and where said controller is further operable to provision a non-pre-coded known signal vectors when said pilots are pre-coded.

In some embodiments, said FDD MIMO radio resource is OFDM based.

BRIEF DESCRIPTION OF THE DRAWINGS

Embodiments of the invention will now be described with reference to the attached drawings in which:

FIG. 4 is an example of equations for performing a pre-coding check;

FIG. 6 is an example of equations for performing a pre-coding codeword check;

DETAILED DESCRIPTION OF THE PREFERRED EMBODIMENTS

In accordance with embodiments of the invention various closed-loop MIMO systems and methods that may involve pre-coding index feedback are described. Specifically the embodiments presented below are intended for use in future 3GPP, 3GPP2 and IEEE 802.16 based wireless standards. The broader inventions set out in the summary, however, are not limited in this regard. Furthermore, while embodiments of the invention are described in the context of an OFDM air interface, the broader concepts are not limited in this regard and are equally applicable to other air interfaces such as the single carrier uplink air interface used for UMTS LTE, or any other FDD air interface adopting a frequency domain MIMO detection approach.

Common Pilot Embodiment

In accordance with an embodiment of the invention, a closed-loop MIMO scheme is provided that uses common pilots in which "beacon pilot vectors" are introduced to enable a receiver to determine a pre-coding codeword used at the transmitter, for example to enable a pre-coding codeword check. Details of such a pre-coding check are provided below. Practically speaking this check can occur nearly instantaneously. For purposes of the common pilot scheme, the beacon pilot vectors are pre-coded whereas the common pilots are not.

Figure 1:
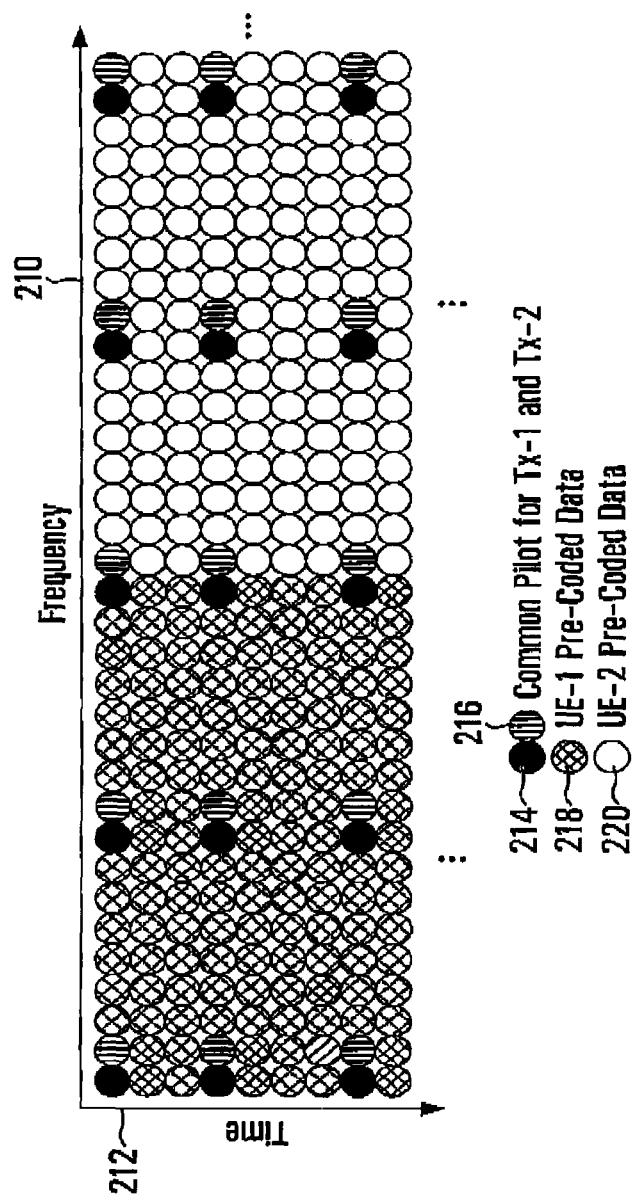
FIG. 1 is an OFDM signal layout diagram for transmit signals that include common pilots.
Figure 2:
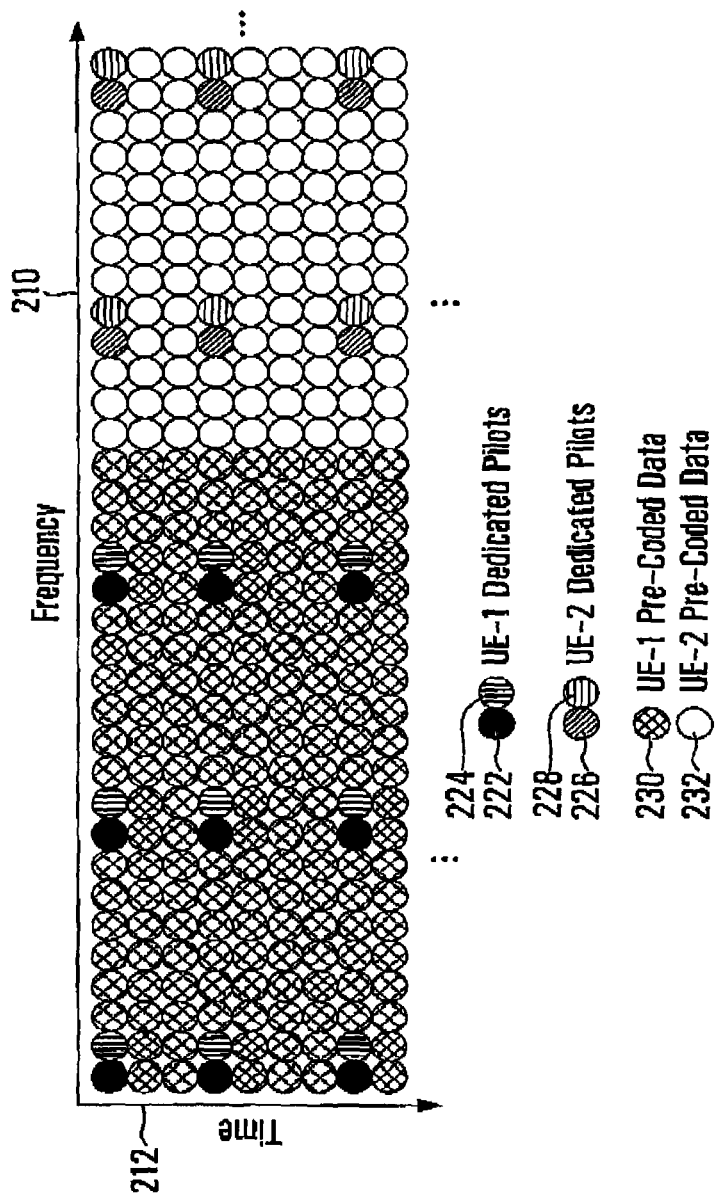
FIG. 2 is an OFDM signal layout diagram for OFDM signals containing dedicated pilots.
Figure 3:
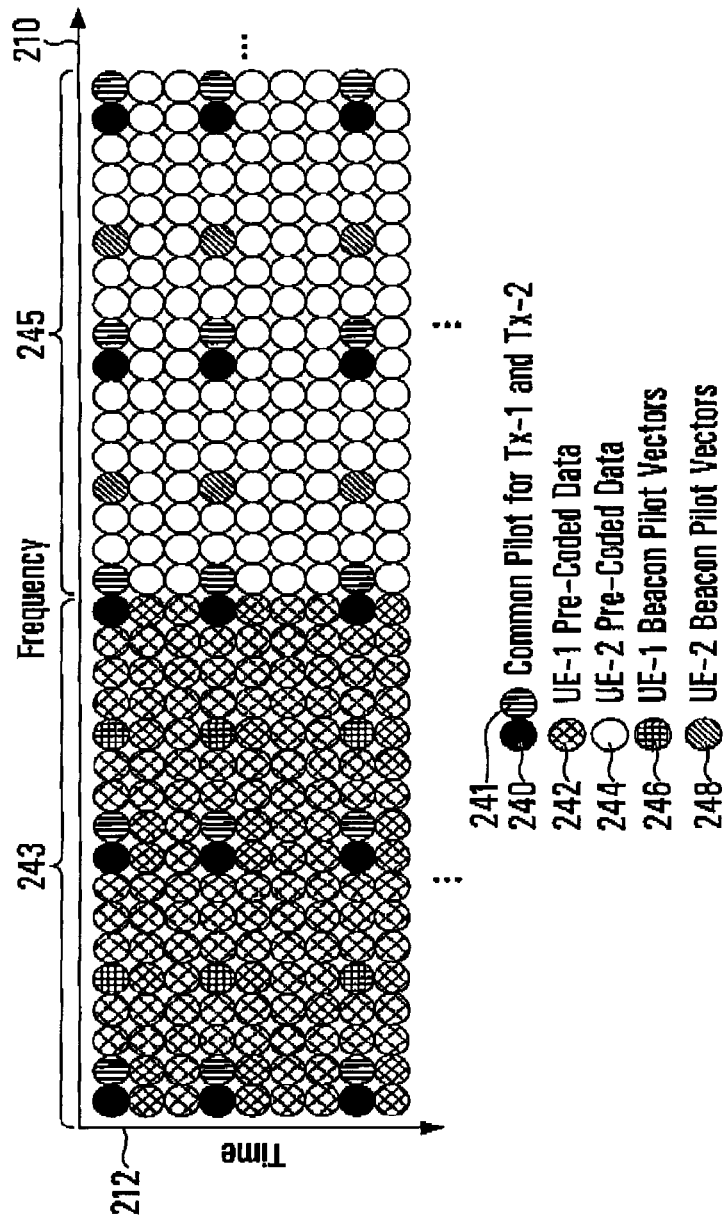
FIG. 3 is an OFDM signal layout diagram for an OFDM signal containing common pilots and pre-coded beacon pilots.

Referring now to the detailed example of FIG. 3, the frequency axis is indicated at 210 and the time axis is indicated at 212. The figure uses a shorthand notation to show what is transmitted on two different antennas. In locations 240, common pilots are transmitted by a first transmit antenna Tx-1, and in locations 241, common pilots are transmitted by a second transmit antenna Tx-2. In the locations used for pilots by one antenna, nulls are transmitted on the other antenna. In each location 246, a beacon pilot vector for UE-1 is transmitted, and in each location 248, a beacon pilot vector for UE-2 is transmitted. Each beacon pilot vector location includes a vector with one element per antenna transmitted simultaneously on the same sub-carrier frequency. This is contrast to the other pilot locations, in which one pilot signal is transmitted at a given time on a given sub-carrier frequency on one antenna with other antennas transmitting nulls. Remaining locations are available for data to be transmitted by both antennas. In the illustrated example, data includes pre-coded data 242 for a first UE (UE-1), and pre-coded data 244 for a second UE (UE-2). Typically, the pre-coding applied for pre-coded data 242 will be different from that applied for pre-coded data 244. With the common pilot approach, the same pilots are used for both UEs and hence they cannot be pre-coded.

In the illustrated example, the beacon pilot vectors are embedded within the area used to transmit data for each of two users. The beacon pilot vectors within area 243 are pre-coded with the same pre-coding used for the pre-coded data 242 for UE-1, and the beacon pilot vectors within area 245 are pre-coded with the same pre-coding used for the pre-coded data 244 for UE-2.

FIG. 3 shows a very specific example in which OFDM resources are used for two different UEs. Of course the number of UEs that can be handled in this manner is implementation specific. The number and location of the pilots for each of the UEs are implementation specific. While the example has focused on a two transmit antenna case, more generally, this is extendable to an N transmit antenna case. In some such embodiments, the pilots include respective pilots for each of the antennas. While groups of two pilots (one for each transmit chain) are shown in FIG. 3, those of ordinary skill in the art will recognize that more than two pilots could be used without departing from the scope of the broader concepts. Similarly, the number and location of beacon pilot vectors shown in FIG. 3 are not limiting. If more beacon pilot vectors are used, additional resources are required though better results may be achieved.

FIG. 4 shows an example of equations that can be used to determine what codeword was used in the transmitter, for example so as to perform a pre-coding codeword check. The equations pertain to each beacon pilot vector location, where it is assumed that the receiver knows which pre-coding codebook it is expecting to be used for its data. In FIG. 4, $H_c$ represents the channel matrix corresponding to the location of a particular beacon pilot vector. An estimate of this can be derived from common pilots. $\bar{s}$ is the transmitted beacon pilot vector that includes one component per antenna. $V_p$ is the pre-coding matrix, and $\bar{n}$ is additive noise. $V_k$=,k=1, . . . L is the pre-coding codebook. An expression for the received beacon pilots $\bar{r}_{beacon\_pilot}$ is given by the first equation 250. The second equation 252 is used to determine which pre-coding matrix was used in the transmitter from a set of L possible pre-coding matrices. Specifically, the expression inside the "argmin" operator in the right hand side of Equation 252 is evaluated for each of the L pre-coding matrices and the pre-coding matrix $V_p$ that results in the minimum of this value is identified. Assuming this matches what the receiver is expecting, then the pre-coding codeword check succeeds. If this does not match what the receiver is expecting, then there is an error.

The approach described above is applied for each of the UE, to independently verify the respective pre-coding matrix used. Each UE needs to verify all the pre-coding matrices intended for it. Note that a UE can have several pre-coding matrices, due to channel differences in its occupied bandwidth.

Multiple beacon pilot vectors within a feedback period can be used jointly for the pre-coding codeword check purposes. However, a minimum of one beacon pilot in a given feedback period is needed.

Where content for multiple users is contained in received signals, the pre-coding codeword check described above is performed at each receiver.

Dedicated Pilot Embodiment

In accordance with another embodiment of the invention, a closed-loop MIMO scheme using dedicated pilots is provided in which beacon pilot vectors are introduced to enable a pre-coding codeword check. For purposes of the dedicated pilot scenario, the beacon pilot vectors are not pre-coded and the pilots are pre-coded. This enables discernment of the pre-coding being used by the transmitter.

Figure 5:
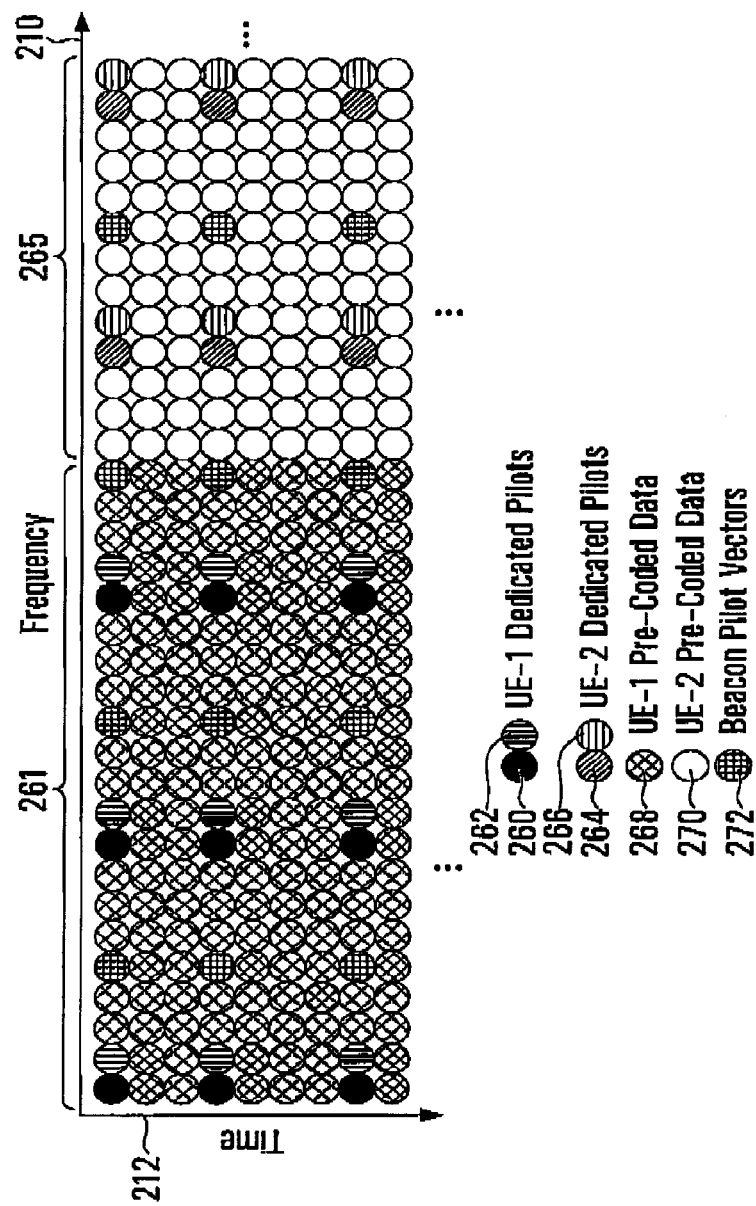
FIG. 5 is an OFDM signal layout diagram showing an OFDM signal with dedicated pilots and non-pre-coded beacon pilots.

Referring now to the detailed example of FIG. 5, in locations 260,262, dedicated pilots are transmitted by a first transmit antenna Tx-1 and a second antenna Tx-2 respectively that are specific to a first UE. In locations 264,266, dedicated pilots are transmitted by the first transmit antenna Tx-1 and the second antenna Tx-2 respectively that are specific to a second UE. In locations 272, beacon pilot vectors are transmitted. As in the previous example, the beacon pilot vectors in a given location consist of a vector with one element per antenna. Remaining locations are available for data to be transmitted by both antennas. In the illustrated example, data includes pre-coded data 268 for the first UE, and pre-coded data 270 for the second UE. Typically, the pre-coding applied for pre-coded data 268 will be different from that applied for pre-coded data 270. With the dedicated pilot approach, different pilots are used for each UE in the sense that they are pre-coded using the same pre-coding matrix as used for the data for each user. More specifically, the dedicated pilots 260,262 that are embedded within the area 261 used to transmit pre-coded data 268 for UE 1 are pre-coded with the same pre-coding as was used for the pre-coded data 268. Similarly, the dedicated pilots 264,266 for the second UE are located within the area 265 used to transmit pre-coded data 270 to the second UE, and the same pre-coding is applied to both the dedicated pilots and the pre-coded data. No pre-coding is applied to the beacon pilot vectors 272.

FIG. 5 shows a very specific example in which OFDM resources are used for two different UEs. Of course the number of UEs that can be handled in this manner is implementation specific. The number and location of the pilots for each of the UEs are implementation specific. While the example has focused on a two transmit antenna case, more generally, this is extendable to an N transmit antenna case. In some such embodiments, the pilots include respective pilots for each of the antennas. While groups of two pilots (one for each transmit chain) are shown in FIG. 5, those of ordinary skill in the art will recognize that more than two pilots could be used without departing from the scope of the broader concepts. Similarly, the number and location of beacon pilot vectors shown in FIG. 5 are not limiting. If more beacon pilot vectors are used, additional resources are required though better results may be achieved.

FIG. 6 shows an example of a set of equations that can be used to perform a pre-coding check for the example of FIG. 5, all of which pertain to a particular beacon pilot location. In FIG. 6, $H_c$ represents the channel matrix without pre-coding. "G" is an effective channel matrix including both the effects of the channel (estimated from dedicated pilots) and the pre-coding matrix, and $\bar{s}_{beacon\_pilot}$ is the transmitted beacon pilot vector. The effective channel matrix will thus be different for each user given that different pre-coding has been applied. $V_p$ is the pre-coding matrix and $\bar{n}$ is additive noise. An expression for the received beacon pilot vectors $\bar{r}_{beacon\_pilot}$ is given by the first equation 280. The second equation 282 gives G as a function of $H_c$ and $V_p$ and the fourth equation 286 gives $H_c$ as a function of $V_p'$ and G. The third equation 284 is used to determine which pre-coding matrix was used in the transmitter from a set of L possible pre-coding matrixes. More specifically, the expression inside the "argmin" operator in Equation 284 is evaluated for each of the possible pre-coding matrices $V_k$, for k=1 to L and the expression that results in the minimum value is selected as $\hat{V}_p$. Assuming this matches what the receiver is expecting, then the pre-coding codeword check succeeds. If this does not match what the receiver is expecting, then there is an error.

The approach described above is applied for each of the UE, to independently verify the respective pre-coding matrix used. Each UE needs to verify all the pre-coding matrices intended for it. Note that a UE can have several pre-coding matrices, due to channel differences in its occupied bandwidth.

Once again multiple beacon pilot vectors within a feedback period can be used jointly for the pre-coding codeword check purposes. However, a minimum of one beacon pilot vector in a given feedback period is needed.

When estimation noise power is larger than the codeword quantization distances, an estimation error can occur. The larger the distance between codebook entries the smaller the probability of error. Several methods can be employed to make detection more reliable:

use more than one beacon pilot vector for each user (for each sub-band for the example of FIG. 5);

track the codeword error—if the same wrong codeword is detected twice, then it is safe to assume that this specific codeword was used as an earlier pre-coding codeword; or when in doubt, use the whole index feedback approach.

With the dedicated pilot approach, other UEs in the system can track the channel by looking at the dedicated pilots and the unpre-coded beacons so that they can use proper closed-loop schemes and be scheduled properly. Since other UEs do not know $V_p$, they cannot track the channel used by pre-coding. This makes scheduling difficult, because a scheduler has no way to know in advance which UE this resource should be allocated to. To solve this problem, the other UEs can examine the non-pre-coded beacon pilot vectors. Since the number of codewords is limited, this provides an efficient way for channel tracking.

Denoting $\bar{s}_{pilot}$ as a known pilot vector, then the received signal on that particular pilot tone is given by $$\bar{r}_{pilot} = H_c \bar{s}_{pilot} + \bar{n}.$$

From dedicated pilots, we have $G = H_c V_p$. Let $\{V_k, k=1, \ldots, L\}$ be the pre-coding codebook; then the pre-coding codeword $V_p$ used by the BTS can be estimated as $$\hat{V}_p = \underset{k=1,\ldots,L}{\operatorname{argmin}} \|\bar{r}_{pilot} - GV'_k \bar{s}_{pilot}\|^2,$$

where we assume that a channel matrix is $U_c D_c V'_c$ in its SVD form. After knowing $V_p$, a UE will be able to estimate the current channel easily by computing $$\hat{H}_c = \hat{G} \hat{V}_p.$$

With both the dedicated pilot and common pilot embodiments described above feedback errors can be detected very quickly. If a received packet is still in error but the packet data error was not caused by pre-coding codeword feedback error, the received data can be used for H-ARQ purposes. In the dedicated pilot case, even when pre-coding feedback is wrong, the received data can still be used for H-ARQ purpose. The reason is that with dedicated pilots, the pilot channel is the same as the data channel, and hence the reference is still correct for coherent detection. In the common pilot case, when pre-coding feedback is wrong, and if the receiver does not know what pre-coding matrix is being used by the transmitter, the data channel cannot be correctly reconstructed. In this case the received data will need to be discarded. However, when a feedback error occurs, if the pre-coding matrix used by the transmitter can be detected successfully notwithstanding the error, then the data channel can still be correctly reconstructed. In other words, if the receiver knows what pre-coding matrix is being used by the transmitter, regardless of whether the feedback is correct or wrong, the received data can still be used. Of course, in this case, as explained above, the benefit of pre-coding is reduced.

In addition, in some embodiments, differential feedback is employed, and the subsequent differential codeword index feedback is based on the codeword currently used by the transmitter (as verified by the check), and this eliminates any error propagation instantly. That is to say, when a codeword feedback error has been determined, the index that was used by the transmitter is known from the check, and the next differential codeword feedback will be based on this index.

Figure 7:
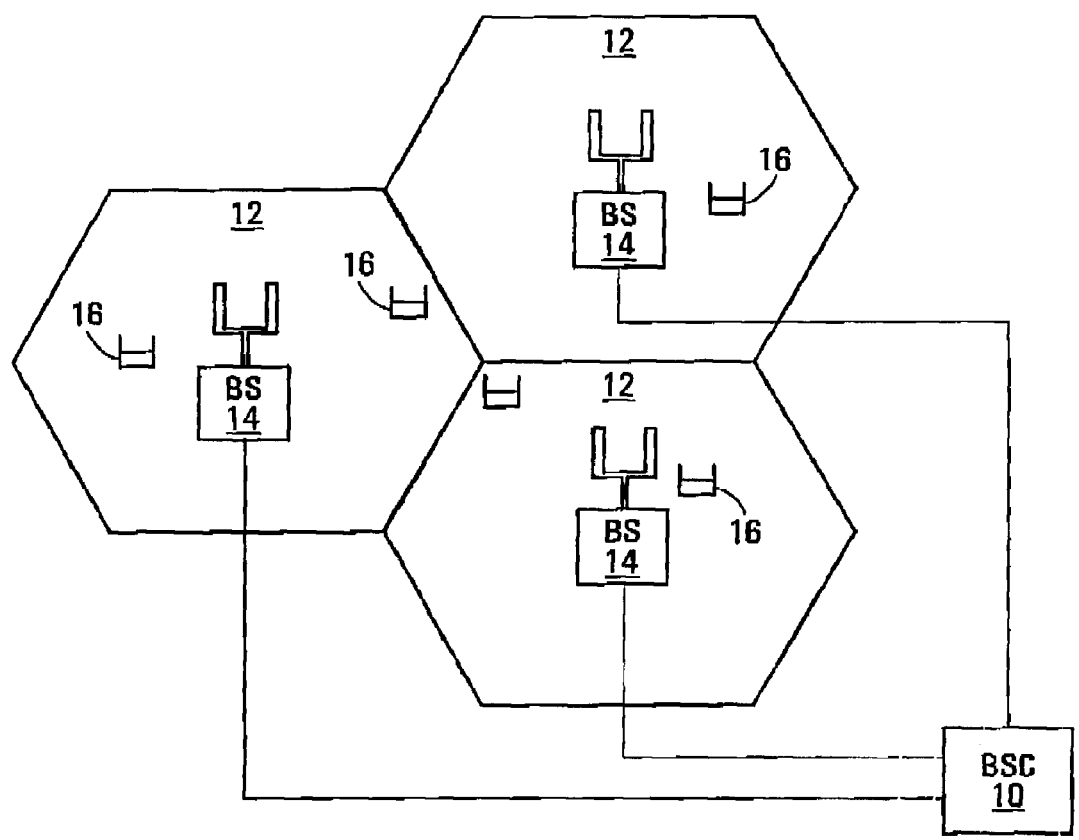
FIG. 7 is a block diagram of a cellular communication system.

With reference to FIG. 7, a base station controller (BSC) 10 controls wireless communications within multiple cells 12, which are served by corresponding base stations (BS) 14. In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 8:
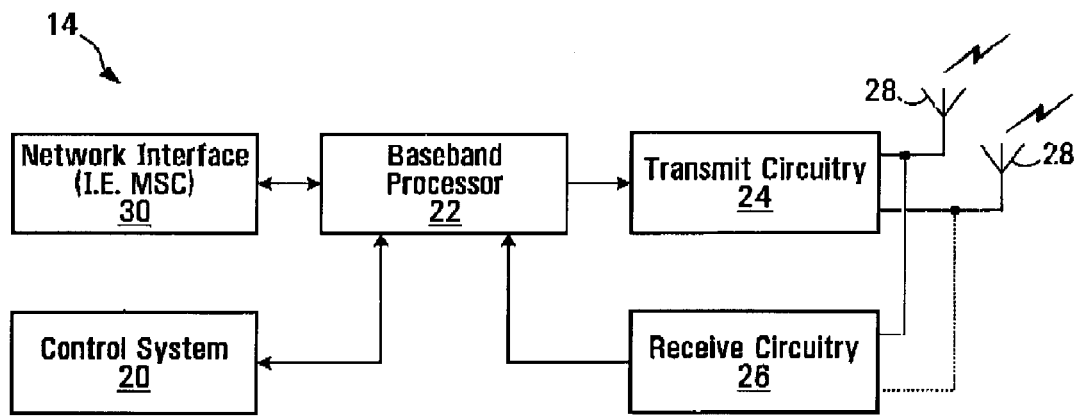
FIG. 8 is a block diagram of an example base station that might be used to implement some embodiments of the present invention.

A high level overview of the mobile terminals 16 and base stations 14 of the present invention is provided prior to delving into the structural and functional details. With reference to FIG. 8, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 9). A low noise amplifier and a filter (not shown) may be provided that cooperate to amplify and remove out-of-band interference from the signal for processing. Down conversion and digitization circuitry (not shown) will then down convert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 9:
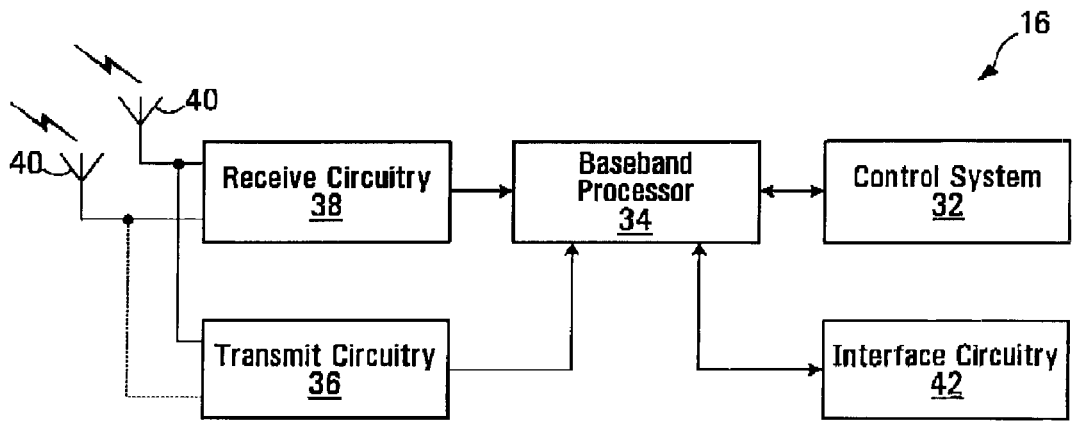
FIG. 9 is a block diagram of an example wireless terminal that might be used to implement some embodiments of the present invention.

With reference to FIG. 9, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove out-of-band interference from the signal for processing. Down conversion and digitization circuitry (not shown) will then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In some embodiments, OFDM is used for at least the downlink transmission from the base stations 14 to the mobile terminals 16. Each base station 14 is equipped with n transmit antennas 28, and each mobile terminal 16 is equipped with m receive antennas 40. Notably, the respective antennas can be used for reception and transmission using appropriate duplexers or switches and are so labeled only for clarity.

Figure 10A:
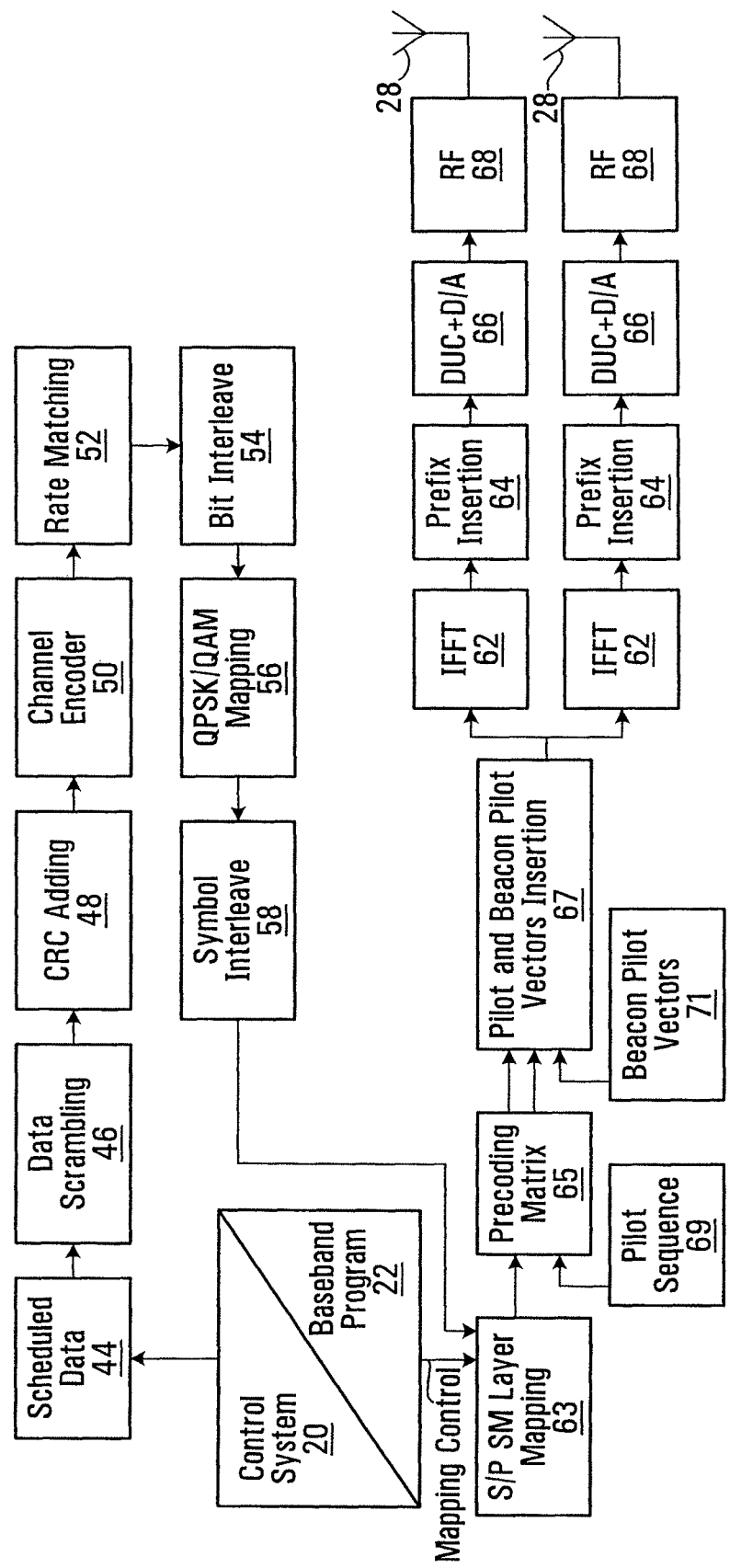
FIGS. 10A and 10B are block diagrams of a logical breakdown of example OFDM transmitter architectures that might be used to implement some embodiments of the present invention.
Figure 10B:
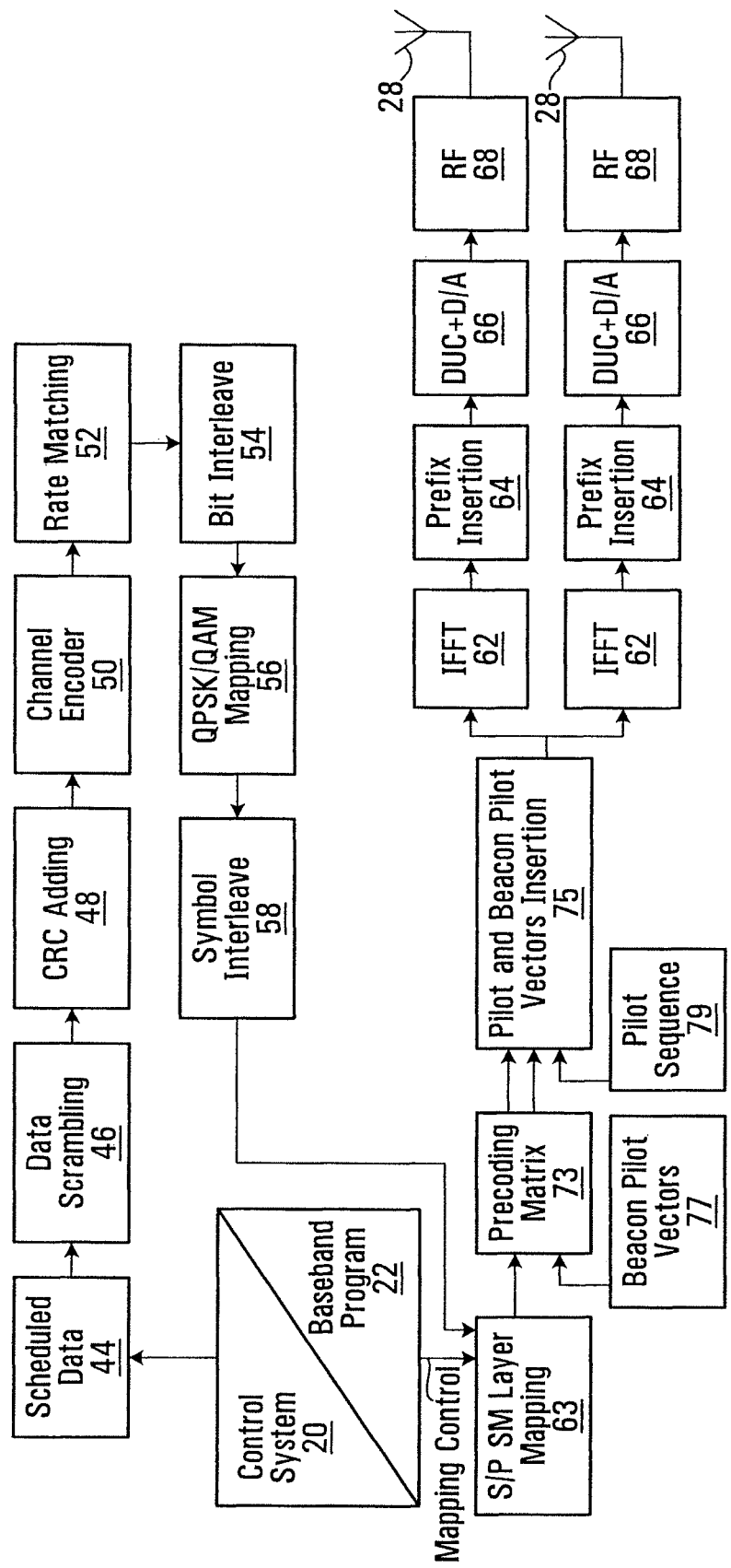

With reference to FIGS. 10A and 10B, a logical OFDM transmission architecture is provided according to one embodiment. FIG. 10A is an example of a dedicated pilot embodiment. FIG. 10B is an example of a common pilot embodiment. In both cases, initially, the base station controller 10 (FIG. 7) will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobiles terminal 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation.

Now referring specifically to FIG. 10A, for the dedicated pilot embodiment, the symbols are processed by S/P, SM layer mapping function 63 which performs serial to parallel (S/P) conversion, and spatial multiplexing (SM) layer mapping. The output of this process is multiplied by the pre-coding matrix multiplier 65. A pilot sequence 69 is also multiplied by the pre-coding matrix multiplier 65 using the same pre-coding matrix. The output of the pre-coding matrix multiplier 65 is input to pilot and beacon pilot vectors insertion function 67. Non-pre-coded beacon pilot vectors 71 are also input to the pilot and beacon pilot vectors insertion function 67. The pilots and beacon pilot vectors and data are then organized into two output streams, one per antenna.

Now referring specifically to FIG. 10B, for the common pilot embodiment, the symbols are processed by S/P, SM layer mapping function 63 which performs serial to parallel conversion, and spatial multiplexing layer mapping. The output of this process is multiplied by the pre-coding matrix multiplier 73. Beacon pilot vectors 77 are also multiplied by the pre-coding matrix multiplier 73 using the same pre-coding matrix. The output of the pre-coding matrix multiplier 73 is input to pilot and beacon pilot vectors insertion function 75. A non-pre-coded pilot sequence 79 is also input to the pilot and beacon pilot vectors insertion function 75. The pilots and beacon pilot vectors and data are then organized into two output streams, one per antenna.

Referring again to both FIGS. 10A and 10B, each output stream is sent to a corresponding IFFT processor 62, illustrated separately for ease of understanding. Those skilled in the art will recognize that one or more processors may be used to provide such digital signal processing, alone or in combination with other processing described herein. The IFFT processors 62 will operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 11:
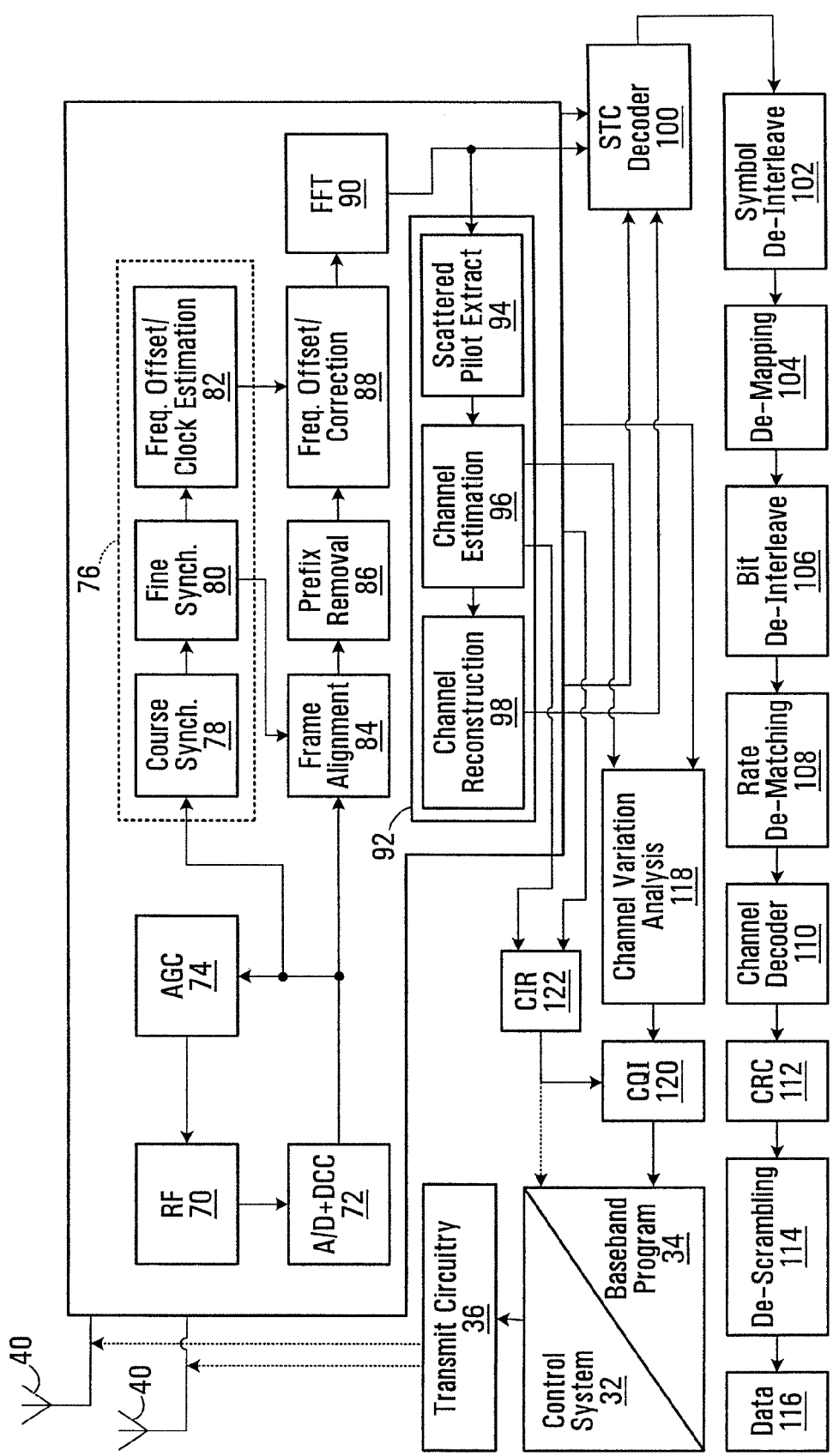
FIG. 11 is a block diagram of a logical breakdown of an example OFDM receiver architecture that might be used to implement some embodiments of the present invention.

Reference is now made to FIG. 11 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control thee gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 12:
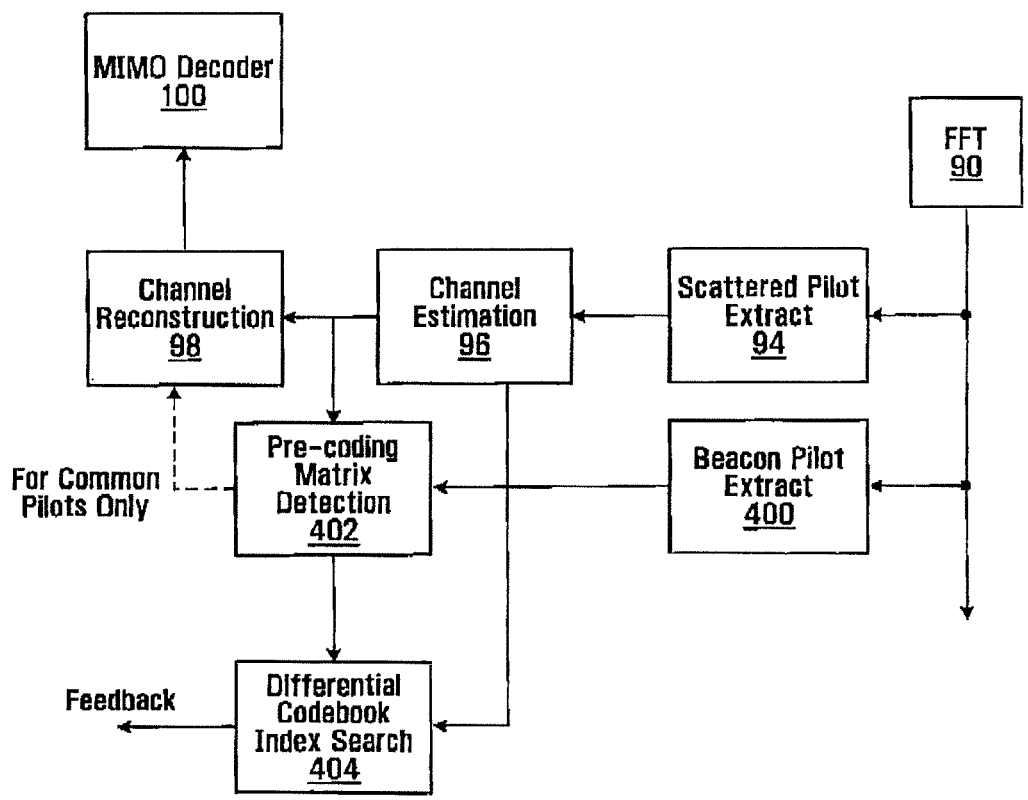
FIG. 12 is a block diagram of an example OFDM receiver architecture.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 12 illustrates an exemplary scattering of pilot symbols among available sub-carriers over a given time and frequency plot in an OFDM environment. Continuing with FIG. 11, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

FIG. 12 shows a block diagram of receiver components for performing beacon pilot extraction, and pre-coding matrix detection. These components can be added to a receiver such as shown in FIG. 11, and in fact some components are shown in FIG. 12 that are in common with those of FIG. 11. The output of FFT 90 is processed by scattered pilot extraction 94, channel estimation and channel reconstruction 98. The output of FFT 90 is also processed by beacon pilot extraction 400. Based on the extracted beacon pilots, the pre-coding codeword matrix detection is performed at 402. For the common pilots embodiment, this is fed back to the channel reconstruction function 98. Outputs of the channel estimation 96 and the pre-coding matrix detection 402 are input to a differential codebook index search 404 which generates feedback that is sent back to the transmitter.

What has been described is merely illustrative of the application of the principles of the invention. Other arrangements and methods can be implemented by those skilled in the art without departing from the spirit and scope of the present invention.

Numerous modifications and variations of the present invention are possible in light of the above teachings. It is therefore to be understood that within the scope of the appended claims, the invention may be practiced otherwise than as specifically described herein.

We claim:

1. A transmitter comprising:
   a pre-coder configured to pre-code each of at least two data symbols using a respective pre-coding codeword to produce a corresponding plurality of pre-coded data symbols;
   a plurality of antennas, each configured to transmit a respective signal, each respective signal comprising one of the pre-coded data symbols and at least one pilot symbol for use in channel estimation;

the signals collectively further comprising at least one beacon pilot vector consisting of a respective beacon pilot per antenna, the beacon pilot vector containing contents known to a receiver for use by the receiver in determining the codeword used to pre-code the at least one data signal, wherein each transmitted signal is an OFDM signal, and wherein for each antenna the respective signal comprises a null in each sub-carrier and time location used to transmit the at least one pilot symbol in the respective signal of each other antenna.

2. The transmitter of claim 1, wherein:
the pre-coder is configured to pre-code the pilot symbols for use in channel estimation for transmission; and
the antennas are configured to transmit the at least one beacon pilot vector without pre-coding.

3. The transmitter of claim 2, wherein:
the antennas are configured to transmit to a plurality of receivers with frequency division duplex (FDD) or time division duplex (TDD) separation between content of different receivers;
the pre-coder is configured to use a respective pre-coding codeword for each receiver; and
the at least one pilot symbol comprises a respective at least one pilot symbol dedicated to each receiver that is pre-coded using the same codeword as the data for that receiver.

4. The transmitter of claim 1, wherein:
the pilot symbols for use in channel estimation are transmitted without pre-coding; and
the at least one beacon pilot vector is transmitted with pre-coding.

5. The transmitter of claim 4, wherein:
the antennas are configured to transmit to a plurality of receivers with FDD or TDD separation between content of different receivers;
the pre-coder is configured to use a respective pre-coding codeword for each receiver; and
the at least one pilot symbol comprises pilot symbols that are for use by all receivers.

6. The transmitter of claim 1, wherein the pre-coder is configured to receive feedback indicating which pre-coding codeword to use.

7. The transmitter of claim 1, wherein the feedback comprises a differential codeword index.

8. The transmitter of claim 1, wherein:
the pre-coder is configured to pre-code for each of a plurality of FDD or TDD MIMO radio resources; and
the antennas are configured to transmit for each of a plurality of FDD or TDD MIMO radio resources.

9. The transmitter of claim 8, wherein the FDD or TDD MIMO radio resources are OFDM resources.

10. The transmitter of claim 8, wherein each FDD or TDD MIMO radio resource is single carrier based.

11. A receiver comprising:
at least one receive antenna configured to receive a MIMO signal containing data symbols pre-coded with a codeword, the MIMO signal including pilot symbols, and including at least one beacon pilot vector containing contents known to a receiver, each beacon pilot vector containing at least one pilot symbol from each transmit antenna, wherein the MIMO signal is an OFDM signal, and wherein the MIMO signal comprises a null in a sub-carrier and a time location used to transmit the pilot symbols in at least one further signal of at least one further antenna of the receiver; and
a processor configured to process the at least one beacon pilot vector to determine which codeword was used to pre-code the data symbols.

12. The receiver of claim 11, wherein the processor is configured to determine if the determined codeword was a codeword expected to be used.

13. The receiver of claim 11, wherein the processor is configured:
to compare the determined codeword with an expected codeword; and
when there is a match between the determined codeword and the expected codeword, to determine that there is no error in codeword feedback, and to perform decoding.

14. The receiver of claim 11, wherein:
the pilot symbols are not pre-coded and the at least one beacon pilot vector is pre-coded; and
the processor is configured to process the at least one beacon pilot vector to determine which codeword was used to pre-code the data by performing channel estimation using the pilot symbols to produce channel estimates and using the known contents of the at least one beacon pilot vector, and the channel estimates to determine which codeword was used.

15. The receiver of claim 11, wherein:
the pilot symbols are also pre-coded and the at least one beacon pilot vector is not pre-coded, and
the processor is configured to process at least one beacon pilot vector to determine which codeword was used to pre-code the data by performing channel estimation using the pre-coded pilot symbols to produce channel estimates and using the known contents of the at least one beacon pilot vector, and the channel estimates to determine which codeword was used.

16. The receiver of claim 15, wherein the processor is configured to track a channel of other receivers by processing the at least one un-precoded beacon pilot vector and pre-coded pilot symbols of other receivers.

17. The receiver of claim 11, further comprising a transmitter configured to transmit feedback indicating which codeword to use.

18. The receiver of claim 17, wherein the processor is configured to compare the determined codeword with the codeword indicated by the feedback to determine if there has been a pre-coding codeword feedback error.

19. The receiver of claim 18, wherein the processor is configured:
upon detecting that there is no pre-coding codeword feedback error, to use received data for H-ARQ purposes; and
upon detecting that there is a pre-coding codeword feedback error, to use the determined codeword in place of the codeword indicated by the feedback.

20. The receiver of claim 19, wherein the transmitter is configured to transmit the differential codeword feedback based on the codeword determined using the at least one beacon pilot vector.

21. The receiver of claim 17, wherein the feedback comprises a differential codeword index.

* * * * *